US007141807B2

(12) United States Patent
Joyce et al.

(10) Patent No.: US 7,141,807 B2
(45) Date of Patent: Nov. 28, 2006

(54) NANOWIRE CAPILLARIES FOR MASS SPECTROMETRY

(75) Inventors: Timothy H. Joyce, Mountain View, CA (US); Jennifer Qing Lu, Milpitas, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 43 days.

(21) Appl. No.: 10/971,173

(22) Filed: Oct. 22, 2004

(65) Prior Publication Data

US 2006/0097145 A1 May 11, 2006

(51) Int. Cl.
*B01D 59/44* (2006.01)

(52) U.S. Cl. ..................... 250/492.1; 250/284; 257/14; 257/10; 257/9; 257/28; 257/30; 438/3; 438/105

(58) Field of Classification Search ..................... None
See application file for complete search history.

(56) References Cited

U.S. PATENT DOCUMENTS 6,962,823 B1 * 11/2005 Empedocles et al. .......... 438/3
2005/0269559 A1 * 12/2005 Zhou et al. .................. 257/10

FOREIGN PATENT DOCUMENTS

WO WO 2005088293 A1 * 9/2005

* cited by examiner

*Primary Examiner*—Jack Berman
*Assistant Examiner*—Zia R. Hashmi

(57) ABSTRACT

A capillary for a mass spectrometry system is described. The capillary comprises a channel and a tip, and at least one of the channel and the tip comprises a nanowire material.

23 Claims, 3 Drawing Sheets

NANOWIRE CAPILLARIES FOR MASS SPECTROMETRY

TECHNICAL FIELD

The technical field of the invention relates to analytical instruments and, in particular, to mass spectrometry.

BACKGROUND

Various analytical instruments can be used for analyzing proteins and other biomolecules. More recently, mass spectrometry has gained prominence because of its ability to handle a wide variety of biomolecules with high sensitivity and rapid throughput. A variety of ion sources have been developed for use in mass spectrometry. Many of these ion sources comprise some type of mechanism that produces charged species through spraying. One particular type of technique that is often used is Electrospray Ionization ("ESI"). One benefit of ESI is its ability to produce charged species from a wide variety of biomolecules such as proteins. Another benefit of ESI is that it can be readily used in conjunction with a wide variety of chemical separation techniques, such as High Performance Liquid Chromatography ("HPLC"). For example, ESI is often used in conjunction with HPLC for identifying proteins.

Typically, ESI produces a spray of ions in a gaseous phase from a sample stream that is initially in a liquid phase. For a conventional ESI mass spectrometry system, a sample stream is pumped through a metal capillary, while a relatively high electric field is applied between a tip of the metal capillary and an electrode that is positioned adjacent to the tip of the metal capillary. As the sample stream exits the tip of the metal capillary, surface charges are produced in the sample stream, thus pulling the sample stream towards the electrode. As the sample stream enters the high electric field, a combined electro-hydrodynamic force on the sample stream is balanced by its surface tension, thus producing a "Taylor cone." Typically, the Taylor cone has a base positioned near the tip of the metal capillary and extends up to a certain distance away from the tip of the metal capillary, beyond which a spray of droplets is produced. As these droplets move towards the electrode, coulombic repulsive forces and desolvation lead to the formation of a spray of ions in a gaseous phase.

During operation of a conventional ESI mass spectrometry system, characteristics of a Taylor cone can affect characteristics of a spray of ions, which, in turn, can affect results of mass spectrometric analysis. Accordingly, it is desirable to produce Taylor cones with certain reproducible characteristics, such that results of mass spectrometric analysis have a desired level of accuracy and reproducibility.

SUMMARY

The invention provides a mass spectrometry system. The mass spectrometry system comprises an ion source comprising a capillary configured to pass a sample stream. The capillary comprises a portion that is exposed to the sample stream when the sample stream passes through the capillary, and the portion of the capillary comprises a nanowire material. The ion source also comprises an electrode positioned with respect to the capillary, wherein, when a voltage between the capillary and the electrode is applied, ions are produced from the sample stream and are directed towards the electrode. The mass spectrometry system also comprises a detector positioned with respect to the ion source to detect the ions.

The invention also provides an ion source for a mass spectrometry system. The ion source comprises a capillary configured to produce a spray of ions and comprising a nanowire material that is hydrophobic.

In another embodiment, the ion source comprises a capillary comprising a tip that comprises a nanowire composite material. The ion source also comprises an electrode positioned adjacent to the capillary. The ion source further comprises a power source in electrical connection with the capillary and the electrode, and the power source is configured to apply a voltage between the capillary and the electrode.

The invention further provides a capillary for a mass spectrometry system. The capillary comprises a channel and a tip, and at least one of the channel and the tip comprises a nanowire material.

Advantageously, embodiments of the invention allow Taylor cones to be produced with certain reproducible characteristics, such that results of mass spectrometric analysis have a desired level of accuracy and reproducibility. For some embodiments of the invention, reproducibility of Taylor cones can be achieved by using certain materials that are highly hydrophobic, highly electrically conductive, highly robust, and highly inert with respect to typical analytes.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Definitions

Figure 1:
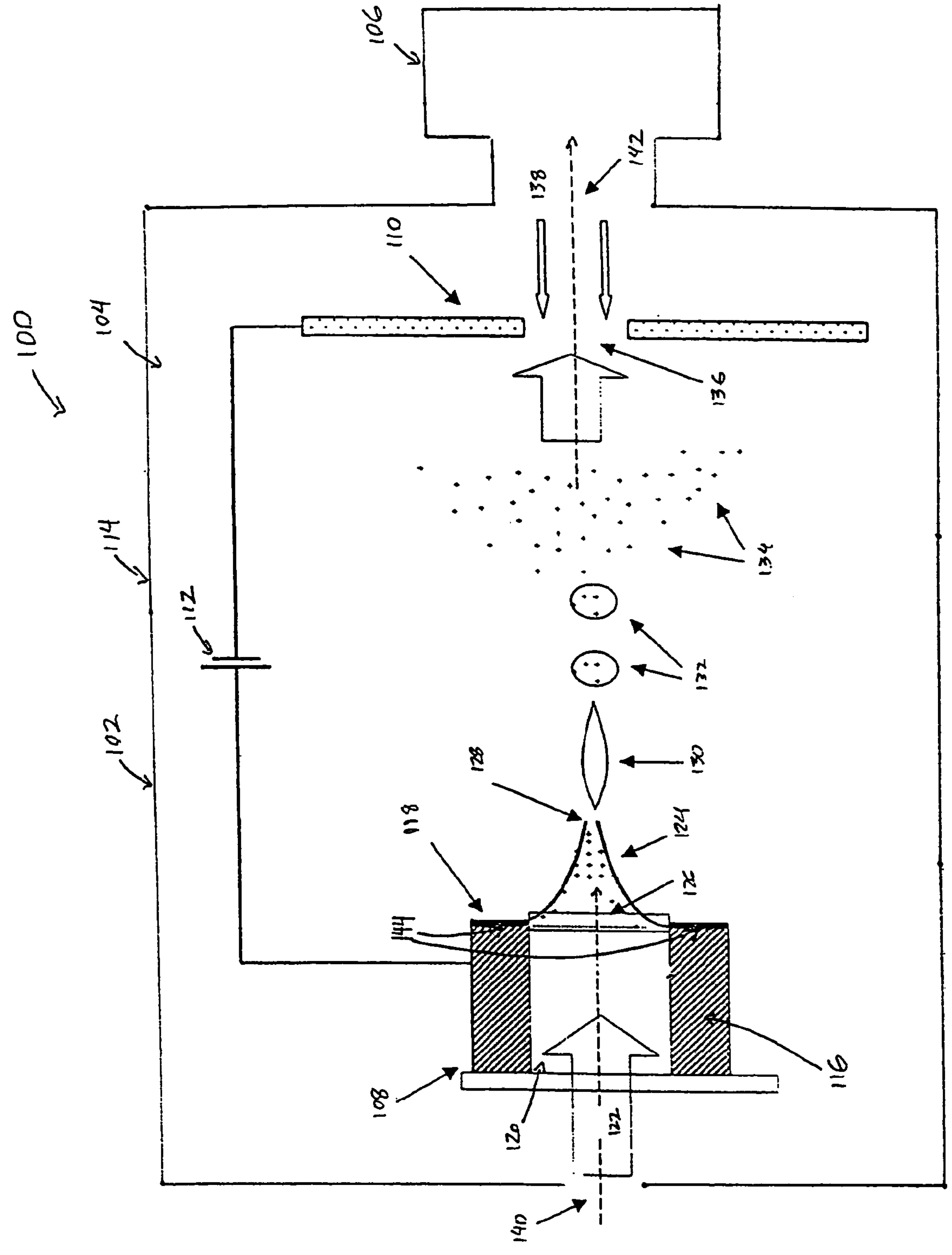
FIG. 1 illustrates a mass spectrometry system implemented in accordance with an embodiment of the invention.

The following definitions apply to some of the elements described with respect to some embodiments of the invention. These definitions may likewise be expanded upon herein.

As used herein, the singular terms "a," "an," and "the" comprise plural referents unless the context clearly dictates otherwise.

As used herein, the term "set" refers to a collection of one or more elements. Thus, for example, a set of nanowires can comprise a single nanowire or multiple nanowires. Elements of a set can also be referred to as members of the set. Elements of a set can be the same or different. In some instances, elements of a set can share one or more common characteristics.

As used herein with reference to a sample stream, the term "exposed" refers to being subject to possible interaction with the sample stream. A material can be exposed to a sample stream without being in actual or direct contact with the sample stream. Also, a material can be exposed to a sample stream if the material is subject to possible interaction with a spray of droplets or a spray of ions produced from the sample stream in accordance with an ionization process.

As used herein, the terms "hydrophilic" and "hydrophilicity" refer to an affinity for water, while the terms "hydrophobic" and "hydrophobicity" refer to a lack of affinity for water. Hydrophobic materials typically correspond to those materials to which water has little or no tendency to adhere. As such, water on a surface of a hydrophobic material tends to bead up. One measure of hydrophobicity of a material is a contact angle between a surface of the material and a line tangent to a drop of water at a point of contact with the surface. Typically, the material is considered to be hydrophobic if the contact angle is greater than 90°.

As used herein, the terms "electrically conductive" and "electrical conductivity" refer to an ability to transport an electric current. Electrically conductive materials typically correspond to those materials that exhibit little or no opposition to flow of an electric current. One measure of electrical conductivity of a material is its resistivity expressed in ohm.centimeter ("Ω·cm"). Typically, the material is considered to be electrically conductive if its resistivity is less than 0.1 Ω·cm. The resistivity of a material can sometimes vary with temperature. Thus, unless otherwise specified, the resistivity of a material is defined at room temperature.

As used herein, the terms "robust" and "robustness" refer to a mechanical hardness or strength. Robust materials typically correspond to those materials that exhibit little or no tendency to fragment under typical operating conditions, such as typical operating conditions of the electrospray capillaries described herein. One measure of robustness of a material is its Vicker microhardness expressed in kg/mm. Typically, the material is considered to be robust if its Vicker microhardness is greater than 1,000 kilogram/millimeter ("kg/mm").

As used herein, the terms "inert" and "inertness" refer to a lack of interaction. Inert materials typically correspond to those materials that exhibit little or no tendency to interact with a sample stream under typical operating conditions, such as typical operating conditions of the electrospray capillaries described herein. Typically, inert materials also exhibit little or no tendency to interact with a spray of droplets or a spray of ions produced from a sample stream in accordance with an ionization process. While a material is sometimes referred to herein as being inert, it is contemplated that the material can exhibit some detectable tendency to interact with a sample stream under certain conditions. One measure of inertness of a material is its chemical reactivity. Typically, the material is considered to be inert if it exhibits little or no chemical reactivity with respect to a sample stream.

As used herein, the term "microstructure" refers to a microscopic structure of a material and can encompass, for example, a lattice structure, crystallinity, dislocations, grain boundaries, constituent atoms, doping level, surface functionalization, and the like. One example of a microstructure is an elongated structure, such as comprising a nanowire. Another example of a microstructure is an array or arrangement of nanowires.

As used herein, the term "nanowire" refers to an elongated structure. Typically, a nanowire is substantially solid and, thus, can exhibit characteristics that differ from those of certain elongated, hollow structures. In some instances, a nanowire can be represented as comprising a filled cylindrical shape. A nanowire typically has a cross-sectional diameter from about 0.5 nanometer ("nm") to about 1,000 nm, such as from about 1 nm to about 200 nm, from about 1 nm to about 100 nm, or from about 1 nm to about 50 nm, and a length from about 0.1 micrometer ("μm") to about 1,000 μm, such as from about 1 μm to about 50 μm or from about 1 μm to about 10 μm. A nanowire can be formed from any of a wide variety of materials, such as inorganic materials and organic materials. Examples of nanowires comprise those formed from semiconductors, such as carbon, silicon, silicon oxide, germanium, gallium nitride, zinc oxide, zinc selenide, cadmium sulfide, and the like. Other examples of nanowires comprise those formed from metals, such as chromium, tungsten, iron, gold, nickel, titanium, molybdenum, and the like. A nanowire typically comprises a substantially ordered array or arrangement of atoms and, thus, can be referred to as being substantially ordered or having a substantially ordered microstructure. It is contemplated that a nanowire can comprise a range of defects and can be doped or surface functionalized. For example, a nanowire can be doped with metals, such as chromium, tungsten, iron, gold, nickel, titanium, molybdenum, and the like. It is also contemplated that a nanowire can comprise a set of heterojunctions or can comprise a core/sheath structure. For example, a nanowire can comprise a core formed from silicon and a sheath surrounding the core and formed from silicon oxide. As another example, a nanowire can comprise a core formed from zinc oxide and a sheath surrounding the core and formed from gallium nitride. Nanowires can be formed using any of a wide variety of techniques, such as arc-discharge, laser ablation, chemical vapor deposition, epitaxial casting, and the like.

As used herein, the term "nanowire material" refers to a material that comprises or is formed from a set of nanowires. In some instances, a nanowire material can comprise a set of nanowires that are substantially aligned with respect to one another or with respect to a certain axis, plane, surface, or three-dimensional shape and, thus, can be referred to as being substantially ordered or having a substantially ordered microstructure. Alignment of a set of nanowires can be performed using any of a wide variety of techniques, such as hybrid pulsed laser deposition/chemical vapor deposition, microfluidic-assisted alignment, Langmuir-Blodgett patterning, and the like.

As used herein, the term "composite material" refers to a material that comprises or is formed from two or more different materials. In some instances, a composite material can comprise or can be formed from materials that share one or more common characteristics. One example of a composite material is one that comprises or is formed from a nanowire material, namely a nanowire composite material. A nanowire composite material typically comprises a matrix material and a set of nanowires dispersed in the matrix material. Examples of matrix materials comprise ceramics, glasses, metals, metal oxides, alloys, polymers, and the like. Additional examples of matrix materials comprise nitrides and disulfides as, for example, described in the patent of Perkins et al., "Ionization Chamber for Reactive Samples," U.S. Pat. No. 6,608,318, the disclosure of which is incorporated herein by reference in its entirety. Further examples of matrix materials comprise super alloys as, for example, described in the patent of Perkins, "Super Alloy Ionization Chamber for Reactive Samples," U.S. Pat. No. 6,765,215, the disclosure of which is incorporated herein by reference in its entirety. Composite materials, such as nanowire composite materials, can be formed using any of a wide variety of techniques, such as colloidal processing, sol-gel processing, die casting, in situ polymerization, and the like.

As used herein, the term "ionization efficiency" refers to a ratio of the number of ions formed in an ionization process and the number of electrons or photons used in the ionization process.

Attention first turns to FIG. 1, which illustrates a mass spectrometry system 100 implemented in accordance with an embodiment of the invention. The mass spectrometry system 100 comprises an ion source 102, which operates to produce ions. In the illustrated embodiment, the ion source 102 operates to produce ions using ESI. However, it is contemplated that the ion source 102 can be implemented to produce ions using any other ionization process. As illustrated in FIG. 1, the mass spectrometry system 100 also comprises a detector 106, which is positioned with respect to the ion source 102 to receive ions. The detector 106 operates to detect ions as a function of mass and charge.

In the illustrated embodiment, the ion source 102 comprises an electrospray capillary 108 and an electrode 110, which is positioned adjacent to the electrospray capillary 108 and serves as a counter-electrode with respect to the electrospray capillary 108. The ion source 102 also comprises a power source 112, which is electrically connected to the electrospray capillary 108 and to the electrode 110. The power source 112 operates to apply a voltage to the electrospray capillary 108 and the electrode 110, thus producing an electric field between the electrospray capillary 108 and the electrode 110. As illustrated in FIG. 1, the ion source 102 also comprises a housing 114, which defines an internal chamber 104 within which the electrospray capillary 108, the electrode 110, and the power source 112 are positioned.

As illustrated in FIG. 1, the electrospray capillary 108 comprises a channel 116 and a tip 118. The channel 116 defines an internal passageway 120 through which a sample stream 122 passes. The sample stream 122 comprises analytes to be analyzed by the mass spectrometry system 100. For example, the sample stream 122 can comprise biomolecules that are dispersed in a suitable solvent, such as water. In the illustrated embodiment, the positioning of the electrospray capillary 108 in the vicinity of the electrode 110 at a negative bias produces an electric field gradient at the tip 118 of the electrospray capillary 108. As the sample stream 122 exits the tip 118 of the electrospray capillary 108, a jump in displacement flux density produces surface charges in the sample stream 122, which pulls the sample stream 122 towards the electrode 110. In conjunction, a combined electro-hydrodynamic force on the sample stream 122 is balanced by its surface tension, thus producing a Taylor cone 124. As illustrated in FIG. 1, the Taylor cone 124 comprises a base 126 positioned near the tip 118 of the electrospray capillary 108. The Taylor cone 124 also comprises a tip 128, which extends into a filament 130. As the filament 130 extends further towards the electrode 110, combined effects of surface tension, coulombic repulsive forces, and small perturbations cause the filament 130 to break up and to form a spray of droplets 132. As these droplets 132 move towards the electrode 110, coulombic repulsive forces and desolvation lead to the formation of a spray of ions 134.

As illustrated in FIG. 1, the electrode 110 defines an aperture 136 near its center. The ions 134 pass through the electrode 110 via the aperture 136 and eventually reach the detector 106. In the illustrated embodiment, a drying gas 138, such as a nitrogen gas, flows in a direction counter to the ions 134 to improve ionization efficiency and to restrain introduction of undesirable materials into the aperture 136. In the illustrated embodiment, the electrode 110 is positioned in a longitudinal relationship with respect to the electrospray capillary 108. In other words, an angle defined by a central axis 140 of the internal passageway 120 and a central axis 142 of the aperture 136 is substantially at 0°. However, it is contemplated that this angle can be adjusted to differ from 0°, such as from about 75° to about 105°. For example, it is contemplated that the electrode 110 can be positioned in an orthogonal relationship with respect to the electrospray capillary 108, such that this angle is substantially at 90°.

During operation of the mass spectrometry system 100, characteristics of the Taylor cone 124 can affect characteristics of the ions 134 that are produced, which, in turn, can affect results of mass spectrometric analysis. Accordingly, it is desirable to produce Taylor cones with certain reproducible characteristics, such that results of mass spectrometric analysis have a desired level of accuracy and reproducibility. In the illustrated embodiment, Taylor cones can be produced with reproducible characteristics by controlling hydrophobicity of the electrospray capillary 108. In particular, if the tip 118 of the electrospray capillary 108 is made sufficiently hydrophobic, the base 126 of the Taylor cone 124 can be restrained from spreading along the tip 118 of the electrospray capillary 108. In such manner, the base 126 of the Taylor cone 124 can be produced with a reproducible shape and size, which can correspond to a shape and size of the internal passageway 120 at the tip 118 of the electrospray capillary 108.

As illustrated in FIG. 1, the tip 118 of the electrospray capillary 108 comprises a hydrophobic material 144. For certain implementations, the hydrophobic material 144 can form a coating that at least partly covers one end of the channel 116, which serves as a substrate. In general, the hydrophobic material 144 can correspond to any of a wide variety of hydrophobic materials. Particularly useful hydrophobic materials correspond to those materials that exhibit a combination of desirable characteristics, comprising hydrophobicity, electrical conductivity, and robustness. In terms of hydrophobicity, particularly useful hydrophobic materials correspond to those materials that provide a hydrophobic surface, such that Taylor cones can be produced with a reproducible shape and size. In particular, the hydrophobic surface desirably exhibits a contact angle with respect to water that is greater than 90°, such as greater than about 100°, greater than about 105°, or greater than about 110°. In terms of electrical conductivity, particularly useful hydrophobic materials correspond to those materials that comprise a relatively low resistivity, such that an electric field can be properly applied between the tip 118 of the electrospray capillary 108 and the electrode 110. In particular, the resistivity is desirably less than 0.1 Ω·cm, such as less than about 0.01 Ω·cm, less than about 0.001 Ω·cm, or less than about 0.0001 Ω·cm. As can be appreciated, use of hydrophobic materials comprising a relatively low resistivity can avoid the need for an additional coating of an electrically conductive material, which additional coating can adversely affect hydrophobicity of the tip 118 of the electrospray capillary 108. In terms of robustness, particularly useful hydrophobic materials correspond to those materials that exhibit little or no tendency to fragment under typical operating conditions of the electrospray capillary 108, thus increasing operational lifetime of the electrospray capillary 108. In particular, the Vicker microhardness of those materials is desirably greater than 1,000 kg/mm, such as greater than about 2,000 kg/mm, greater than about 2,500 kg/mm, or greater than about 3,000 kg/mm. For example, the Vicker microhardness is desirably from about 2,500 kg/mm to about 3,500 kg/mm.

It has been discovered that certain materials can be particularly useful hydrophobic materials, since these materials can exhibit the combination of desirable characteristics described above. In the illustrated embodiment, the hydrophobic material 144 desirably comprises a nanowire material, such as a nanowire composite material. Advantageously, the nanowire material can exhibit a higher level of hydrophobicity, a higher level of electrical conductivity, and a higher level of robustness as compared with certain other types of hydrophobic materials. A further benefit of the nanowire material is its higher level of inertness with respect to typical analytes that can comprise the sample stream 122. Without wishing to be bound by a particular theory, it is believed that a substantially ordered microstructure of the nanowire material contributes to at least some of its desirable and unusual characteristics.

For certain implementations, the nanowire material can form a coating, which can be applied using any of a wide variety of techniques. For example, the nanowire material can be sprayed at high velocity onto a substrate, such that the nanowire material mechanically adheres to the substrate. As another example, the nanowire material can be dispersed in a suitable solvent to form a "paint," and this paint can be applied to the substrate. In some instances, the solvent can be relatively inert. However, it is also contemplated that the solvent can facilitate chemical bonding between the nanowire material and the substrate. Heat can be applied to evaporate the solvent or to promote chemical bonding.

While FIG. 1 illustrates the tip 118 of the electrospray capillary 108 as comprising the hydrophobic material 144, it is contemplated that other portions of the electrospray capillary 108 can comprise the hydrophobic material 144. In particular, it is contemplated that any portion of the electrospray capillary 108 that is exposed to the sample stream 122 can comprise the hydrophobic material 144. For example, the channel 116 can also comprise the hydrophobic material 144, which can form a coating that at least partly covers a surface surrounding the internal passageway 120. Such implementation can facilitate a flow of the sample stream 122 through the electrospray capillary 108, which, in turn, can allow Taylor cones to be produced with reproducible characteristics. In general, it is contemplated that different portions of the electrospray capillary 108 can comprise hydrophobic materials that are the same or different. It is also contemplated that the electrospray capillary 108 can be substantially formed of the hydrophobic material 144.

Figure 2:
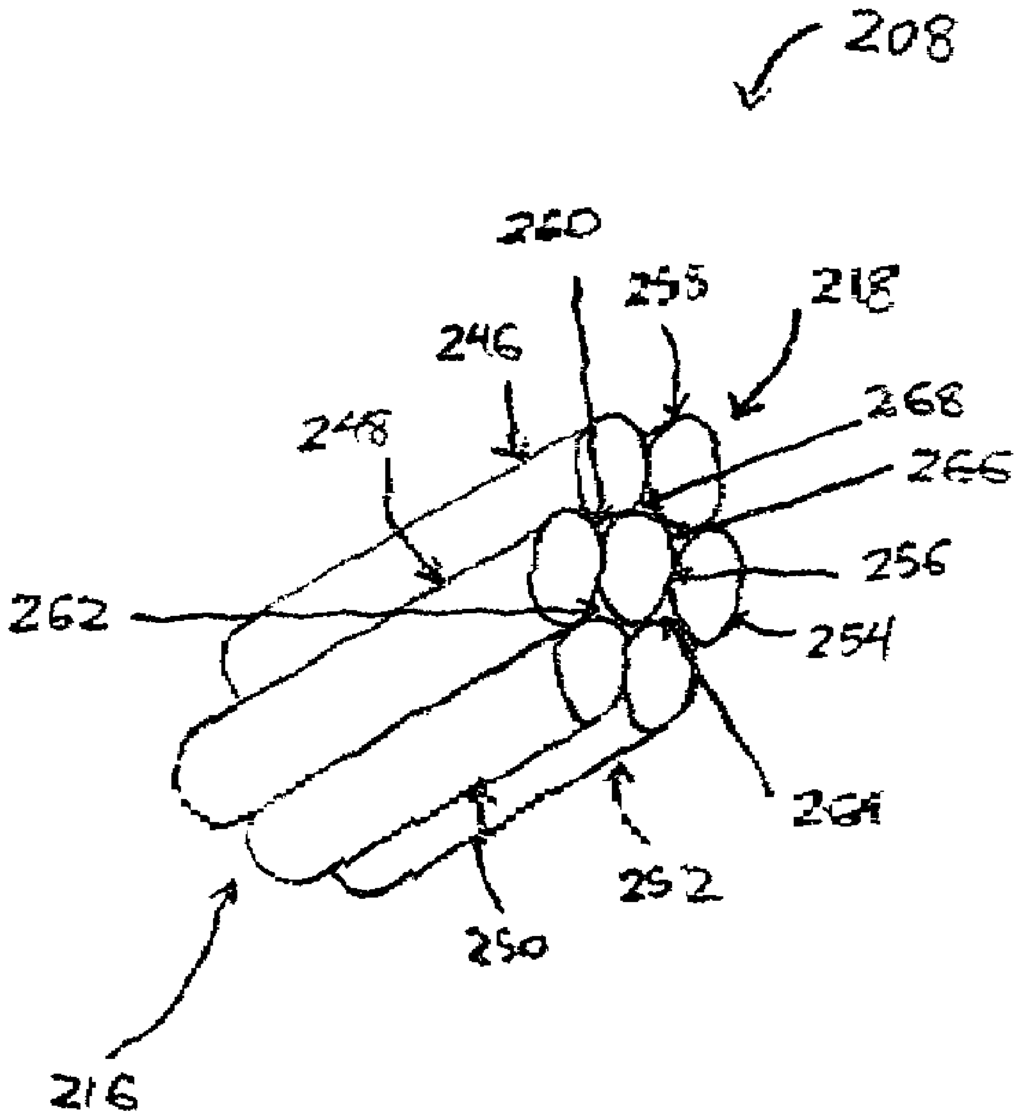
FIG. 2 illustrates an electrospray capillary comprising a set of nanowires, according to an embodiment of the invention.

Attention next turns to FIG. 2, which illustrates an electrospray capillary 208 implemented in accordance with another embodiment of the invention. The electrospray capillary 208 comprises a channel 216 and a tip 218. In the illustrated embodiment, the electrospray capillary 208 comprises a set of nanowires, namely nanowires 246, 248, 250, 252, 254, 256, and 258, and the nanowires 246, 248, 250, 252, 254, 256, and 258 are substantially aligned with respect to one another to form both the channel 216 and the tip 218 of the electrospray capillary 208. While seven nanowires 246, 248, 250, 252, 254, 256, and 258 are illustrated in FIG. 2, it is contemplated that more or less nanowires can be used for other implementations. It is also contemplated that the electrospray capillary 208 can comprise a separate channel, and the nanowires 246, 248, 250, 252, 254, 256, and 258 can be positioned adjacent to the separate channel.

As illustrated in FIG. 2, the nanowires 246, 248, 250, 252, 254, 256, and 258 are positioned with respect to one another to define internal passageways 260, 262, 264, 266, and 268 through which a sample stream can pass. As the sample stream exits the tip 218 of the electrospray capillary 208, Taylor cones can be formed at respective ends of the internal passageways 260, 262, 264, 266, and 268. In the illustrated embodiment, the nanowires 246, 248, 250, 252, 254, 256, and 258 can be positioned with respect to one another, such that the internal passageways 260, 262, 264, 266, and 268 have sufficient cross-sectional sizes to allow flow of certain analytes, such as biomolecules.

The electrospray capillary 208 can be formed using any of a wide variety of techniques. For example, the nanowires 246, 248, 250, 252, 254, 256, and 258 can be positioned with respect to one another using an Atomic Force Microscope ("AFM"). For certain implementations, at least a subset of the nanowires 246, 248, 250, 252, 254, 256, and 258 can comprise a core/sheath structure, and cores of this subset can be at least partly removed using any of a wide variety of techniques, such as preferential etching with xenon fluoride. Removal of the cores can define additional internal passageways through which the sample stream can pass. For such implementations, it is contemplated that a plug material can be used to block flow of the sample stream through at least a subset the internal passageways 260, 262, 264, 266, and 268.

Figure 3:
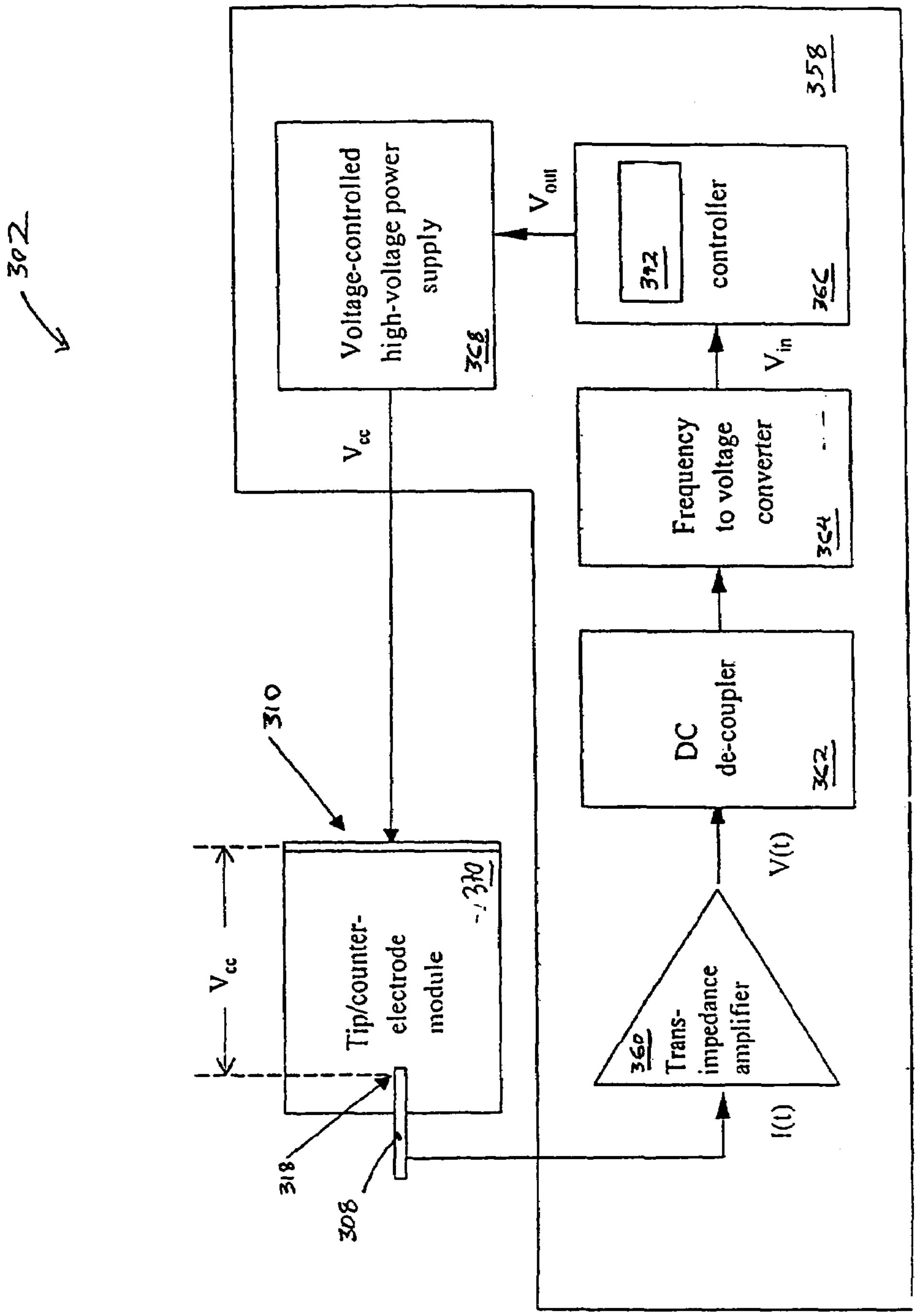
FIG. 3 illustrates an ion source comprising a feedback controller, according to an embodiment of the invention.

It should be recognized that the embodiments of the invention described above are provided by way of example, and various other embodiments are encompassed by the invention. For example, it is contemplated that the electrospray capillaries described herein can be advantageously used in conjunction with a control mechanism to regulate a spray of ions. One example of such a control mechanism is a feedback controller as described in the co-pending and co-owned patent application of Sobek, U.S. patent application Ser. No. 10/896,981, filed Jul. 23, 2004, entitled "Ion Source Frequency Feedback Device and Method," the disclosure of which is incorporated herein by reference in its entirety. FIG. 3 illustrates an ion source 302 comprising a feedback controller 358, in accordance with an embodiment of the invention. The feedback controller 358 operates to detect a modulation frequency of an ionization current I(t) between a tip 318 of an electrospray capillary 308 and a counter-electrode 310, which are positioned in a module 370. Based on this modulation frequency, the feedback controller 358 operates to provide feedback regulation of ESI characteristics by adjusting a voltage $V_{cc}$ between the tip 318 of the electrospray capillary 308 and the counter-electrode 310.

With reference to FIG. 3, the ionization current I(t) between the electrospray capillary 308 and the counter-electrode 310 can experience transient fluctuations in amplitude (i.e., can be modulated) depending on operating conditions of the ion source 302. In particular, depending on the voltage $V_{cc}$, modulation of the ionization current I(t) can have characteristics associated with one of a variety of ESI modes, comprising: (1) a pulsating mode with lower modulation frequencies ("mode I"); (2) a constant-amplitude oscillation mode with intermediate modulation frequencies ("mode II"); and (3) a continuous emission mode with higher modulation frequencies ("mode III"). Among these three modes, mode II and mode III typically provide the most desirable ESI characteristics. Advantageously, a correlation between a magnitude of the modulation frequency and the different ESI modes allows the modulation frequency to be used as an indicator of a particular ESI mode under which the ion source 302 is currently operating. In turn, the voltage $V_{cc}$ can be adjusted until the modulation frequency has a magnitude associated with a desired ESI mode. However, the modulation frequency typically depends on characteristics of a Taylor cone that is produced, such as a size of a base of the Taylor cone. Accordingly, in order for the modulation frequency to be an accurate and reproducible indicator of a particular ESI mode, it is desirable to produce Taylor cones with reproducible characteristics. In the illustrated embodiment, Taylor cones can be produced with reproducible characteristics by controlling hydrophobicity of the electrospray capillary 308 in a similar manner as described above. In particular, if the tip 318 of the electrospray capillary 308 is made sufficiently hydrophobic, Taylor cones can be produced with bases of a reproducible shape and size.

As illustrated in FIG. 3, the feedback controller 358 comprises a transimpedance amplifier 360, a DC de-coupler 362, a frequency-to-voltage converter 364, a controller 366, and a voltage-controlled high-voltage power supply 368. The transimpedance amplifier 360, the DC de-coupler 362, the frequency-to-voltage converter 364, the controller 366, and the voltage-controlled high-voltage power supply 368 comprise a closed feedback loop to provide feedback regulation of ESI characteristics.

The transimpedance amplifier 360 operates to convert the ionization current I(t) into a voltage V(t). Since typical nano-flow ionization currents can range from about 5 nA to about 150 nA and can exhibit modulation frequencies up to about 200 kHz, the transimpedance amplifier 360 desirably has a bandwidth of at least about 400 kHz and a gain of about $10^7$. Amplifiers with such specifications are commercially available. Alternatively, the transimpedance amplifier 360 can be implemented using a two-stage Op-Amp design, such as using a low noise transimpedance module for current to voltage conversion and a boost Op-Amp stage for further signal amplification.

The DC de-coupler 362 operates to remove a Direct Current ("DC") component of the voltage V(t). In turn, the frequency-to-voltage converter 364 responds to an input frequency of the voltage V(t) and delivers to the controller 366 an input voltage $V_{in}$ that is linearly proportional to this input frequency. In other words, the transimpedance amplifier 360, the DC de-coupler 362, and the frequency-to-voltage converter 364 operate to convert frequency information in the ionization current I(t) into the input voltage $V_{in}$.

In the illustrated embodiment, the controller 366 can be implemented using a microprocessor 372 that operates to produce an output voltage $V_{out}$ from the input voltage $V_{in}$ in accordance with a set of processor-executable instructions. The output voltage $V_{out}$ controls the voltage-controlled high-voltage power supply 368, which applies the voltage $V_{cc}$ between the tip 318 of the electrospray capillary 308 and the counter-electrode 310. As illustrated in FIG. 3, the voltage $V_{cc}$ is proportional to the output voltage $V_{out}$. The voltage $V_{cc}$ can be a DC voltage or a DC voltage with an Alternating Current ("AC") component. For certain implementations, the DC voltage can be used to establish a highest possible electric field for which there is no ESI action. High-voltage AC pulses can be superimposed on the DC voltage to elicit on-demand droplet formation. The AC pulses can be produced using suitable high voltage amplifier circuits and can be, for example, sinusoidal, square-shaped, or triangular-shaped. A shape and a duty cycle of the AC pulses can be adjusted to control characteristics of a Taylor cone, thus creating a spray of ions with desired characteristics. It is contemplated that the AC pulses can be synchronized with respect to sampling electronics to provide for a desired level of sensitivity and reproducibility.

In the illustrated embodiment, the voltage $V_{cc}$ is applied to the counter-electrode 310, while the transimpedance amplifier 360 is electrically connected to the electrospray capillary 308, which is grounded. However, it is contemplated that the voltage $V_{cc}$ can be applied to the tip 318 of the electrospray capillary 308, and the ionization current I(t) can be detected at the tip 318 of the electrospray capillary 308 or at the counter-electrode 310. It is contemplated that a voltage-controlled flow rate controller can be used in place of, or in conjunction with, the voltage-controlled high-voltage power supply 368. The voltage-controlled flow rate controller can operate to adjust a flow rate of a sample fluid passing through the electrospray capillary 308 based on the output voltage $V_{out}$.

Desirably, the module 370 is shielded from interfering signals to improve a signal-to-noise ratio for the operations described above. Proper shielding can be achieved by, for example, using a grounded electrically conductive housing. Connections in and out of the housing can be implemented using coaxial cables.

A practitioner of ordinary skill in the art requires no additional explanation in developing the electrospray capillaries described herein but may nevertheless find some helpful guidance by examining the following articles: Taylor G. I., "Disintegration of Water Drops in an Electric Field," *Proceedings of the Royal Society of London*, A280, 383–397, 1964; Bruins A. P., "Mechanistic Aspects of Electrospray Ionization," *Journal of Chromatography A,* 794, 345–347, 1998; Juraschek et al., "Pulsation Phenomena During Electrospray Ionization," *International Journal of Mass Spectrometry,* 177, 1–15, 1998; Cech et al., "Practical Implications of Some Recent Studies in Electrospray Ionization Fundamentals," *Mass Spectrometry Reviews,* 20, 362–387, 2001; and Lee et al., "Taylor Cone Stability and ESI Performance for LC-MS at Low Flow Rates," *Proceedings of the American Society of Mass Spectrometry,* 2002; the disclosures of which are incorporated herein by reference in their entireties.

A practitioner of ordinary skill in the art may also find some helpful guidance regarding characteristics and formation of nanowire materials by examining the following articles: Abramson et al., "Fabrication and Characterization of a Nanowire/Polymer-based Nanocomposite for a Prototype Thermoelectric Device," *J. Microelectromechanical Systems,* 13, 505, 2004; Kuykendall et al., "Crystallographic Alignment of High Density Gallium Nitride Nanowire Arrays," *Nature Materials,* 3, 528, 2004; Law et al., "Semiconductor Nanowires and Nanotubes," *Annu. Rev. Mater. Sci.,* 34, 83, 2004; Qian et al., "Synthesis of Iron Phosphide Nanorod/Nanowires in Solution," *J. Am. Chem. Soc.,* 126, 1195, 2004; Tao et al., "Langmuir-Blodgett Silver Nanowire Monolayers for Molecular Sensing with High Sensitivity and Specificity," *Nano. Lett.,* 3, 1229, 2003; Stach et al., "Watching GaN Nanowires Grow," *Nano. Lett.,* 3, 867, 2003; Goldberger et al., "Single Crystal Gallium Nitride Nanotubes," *Nature,* 422, 599, 2003; Xia et al., "Chemistry and Physics of Nanowires," *Adv. Mater.,* 15, 351, 2003; Gates et al., "Synthesis and Characterization of Crystalline $Ag_2Se$ Nanowires Through a Template-Engaged Reaction at Room Temperature," *Adv. Func. Mater.,* 12, 679, 2002; Wu et al., "Inorganic Semiconductor Nanowires," *Int. J. Nano.* (Invited Review, Inaugural Issue), Jan. 1, 2002; Yang et al., "Rational synthesis of ZnO Nanowires and their Optical Properties," *Adv. Func. Mater.* (Invited Feature Article), 12, 323, 2002; Zheng et al., "Synthesis of Ultra-Long and Highly-Oriented Silicon Oxide Nanowires from Alloy Liquid," *Adv. Mater.,* 14, 122, 2002; Wu et al., "Block-by-Block Growth of Si/SiGe Superlattice Nanowires," *Nanolett.,* 2, 83, 2002; Wu et al., "Inorganic Semiconductor Nanowires: Rational Growth, Assemblies and Novel Properties," *Euro. J. Chemistry* (Invited Concept Article), 8, 1260, 2002; Song et al., "$MMo_3Se_3$ ( M=Li+, Na+, Rb+, Cs+, NMe4+)

Nanowire Formation via Chimie Douce Reaction," *J. Am. Chem. Soc.,* 123, 9714, 2001; Kwan et al., "Synthesis and Assembly of $BaWO_4$ Nanorods," *Chem. Commun.,* 5, 447, 2001; Wu et al., "Direct Observation of Vapor-Liquid-Solid Nanowire Growth," *J. Am. Chem. Soc.,* 123, 3165, 2001; Huang et al., "Catalytic Growth of Zinc Oxide Nanowires Through Vapor Transport," *Adv. Mater.,* 13(2), 113, 2001; Wu et al., "Germanium/Carbon Core-Sheath Nanostructures," *Appl. Phys. Lett.,* 77, 43, 2000; Wu et al., "Germanium Nanowire Growth via Simple Vapor Transport," *Chem. Mater.,* 12, 605, 2000; Hu et al., "Growth and Electrical Properties of Nanotube/Nanowire Heterojunctions," *Nature,* 399, 48, 1999; Viernow et al., *Appl. Phys. Lett.,* 72, 948, 1998; Lin et al., *J. Appl. Phys.,* 84, 255, 1998; Kirakosian et al., *Appl. Phys. Lett.,* 79, 1608, 2001; Viernow et al., *Appl. Phys. Lett.,* 74, 2125, 1999; Losio et al., *Phys. Rev. Lett.,* 86, 4632, 2001; and Robinson et al., *Phys. Rev. Lett.,* 88, 096104, 2002; the disclosures of which are incorporated herein by reference in their entireties.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

We claim:

1. A mass spectrometry capillary, comprising:

a channel and a tip, at least one of the channel and the tip comprising a nanowire material wherein the mass spectrometry capillary is configured to produce ions from analytes passing through the mass spectrometry capillary.

2. The mass spectrometry capillary of claim 1, wherein the tip comprises a coating that comprises the nanowire material.

3. The mass spectrometry capillary of claim 1, wherein the nanowire material provides a hydrophobic surface, and the hydrophobic surface exhibits a contact angle with respect to water that is greater than 100°.

4. The mass spectrometry capillary of claim 3, wherein the contact angle is greater than 105°.

5. The mass spectrometry capillary of claim 1, wherein the nanowire material comprises a resistivity that is less than 0.1 Ω·cm.

6. The mass spectrometry capillary of claim 5, wherein the resistivity is less than 0.01 Ω·cm.

7. An ion source for a mass spectrometry system, comprising:

a capillary configured to produce a spray of ions and comprising a set of nanowires that are positioned with respect to one another to define an internal passageway.

8. The ion source of claim 7, wherein each of the set of nanowires provides a hydrophobic surface to regulate the spray of ions.

9. The ion source of claim 7, wherein at least one of the set of nanowires comprises a material selected from the group consisting of carbon, silicon, silicon oxide, germanium, gallium nitride, zinc oxide, zinc selenide, and cadmium sulfide.

10. The ion source of claim 7, wherein at least one of the set of nanowires comprises a material selected from the group consisting of chromium, tungsten, iron, gold, nickel, titanium, and molybdenum.

11. The ion source of claim 7, wherein the capillary comprises a tip that comprises the set of nanowires.

12. The ion source of claim 7, further comprising:

an electrode positioned adjacent to the capillary, the electrode comprising an aperture configured to receive the spray of ions when a voltage between the capillary and the electrode is applied.

13. The ion source of claim 12, further comprising:

a feedback loop in electrical connection with the capillary and the electrode, the feedback loop being configured to regulate the spray of ions by adjusting the voltage between the capillary and the electrode.

14. An ion source for a mass spectrometry system, comprising:

a capillary comprising a tip that comprises a nanowire composite material;

an electrode positioned adjacent to the capillary; and a power source in electrical connection with the capillary and the electrode, the power source being configured to apply a voltage between the capillary and the electrode.

15. The ion source of claim 14, wherein the nanowire composite material is substantially ordered.

16. The ion source of claim 14, wherein the tip comprises a coating that comprises the nanowire composite material.

17. The ion source of claim 14, wherein the tip comprises a hydrophobic surface that comprises the nanowire composite material, and the hydrophobic surface exhibits a contact angle with respect to water that is greater than 100°.

18. The ion source of claim 14, wherein the nanowire composite material comprises a resistivity that is less than 0.1 Ω·cm.

19. A mass spectrometry system, comprising:

(a) an ion source comprising:

(i) a capillary configured to pass a sample stream comprising analytes, the capillary comprising a portion that is exposed to the sample stream when the sample stream passes through the capillary, the portion of the capillary comprising a nanowire material; and (ii) an electrode positioned with respect to the capillary, wherein, when a voltage between the capillary and the electrode is applied, ions are produced from the analytes and are directed towards the electrode; and (b) a detector positioned with respect to the ion source to detect the ions as a function of mass and charge.

20. The mass spectrometry system of claim 19, wherein the nanowire material comprises a nanowire composite material.

21. The mass spectrometry system of claim 20, wherein the nanowire composite material comprises a matrix material and a set of nanowires dispersed in the matrix material.

22. The mass spectrometry system of claim 21, wherein the matrix material is selected from the group consisting of ceramics, glasses, metals, metal oxides, alloys, and polymers.

23. The mass spectrometry system of claim 19, wherein the ion source further comprises:

a feedback loop electrically connected to the capillary and to the electrode, the feedback loop being configured to regulate the voltage between the capillary and the electrode.

* * * * *